United States Patent [19]

Fry

[11] 3,941,090

[45] Mar. 2, 1976

[54] CEDAR-BASED ANIMAL LITTER

[75] Inventor: Raymond J. Fry, Concord, Calif.

[73] Assignee: The Clorox Company, Oakland, Calif.

[22] Filed: Oct. 10, 1974

[21] Appl. No.: 513,559

[52] U.S. Cl. .................................................. 119/1
[51] Int. Cl.² .......................................... A01K 29/00
[58] Field of Search .......................................... 119/1

[56] References Cited
UNITED STATES PATENTS

| | | | |
|---|---|---|---|
| 3,636,927 | 1/1972 | Baum | 119/1 |
| 3,675,625 | 7/1972 | Miller et al. | 119/1 |
| 3,747,564 | 7/1973 | Bickoff et al. | 119/1 |
| 3,828,731 | 8/1974 | White | 119/1 |

Primary Examiner—Hugh R. Chamblee
Attorney, Agent, or Firm—Phillips, Moore, Weissenberger Lempio & Strabala

[57] ABSTRACT

The invention provides a pelletted cedar-based composition comprising particles of cedar material and an alfalfa binder. Pellets comprising this composition are characterized by a pleasant odor, durability, and good adsorption, and odor neutralizing characteristics; such pellets, produced from material with known insect repellant characteristics, have particular utility as an animal litter.

8 Claims, No Drawings

CEDAR-BASED ANIMAL LITTER

BACKGROUND OF THE INVENTION

This invention relates to a cedar-based composition and a process for making this composition. In particular, this invention relates to a pelletized composition comprising cedar waste and an alfalfa binder, which has particular use as an animal litter.

Compositions including alfalfa or related forage crops are known for their utility as animal litters which effectively absorb animal waste materials and neutralize associated unpleasant odors. Such compositions are exemplified by those described in U.S. Pat. Nos. 3,286,691 to McFadden and 3,425,397 to Schlielien, et al., issued respectively on Nov. 22, 1966 and on Feb. 4, 1969, comprising respectively a particulate dehydrated alfalfa product and an alfalfa-vermiculite composition. These known prior art compositions, however, have concomitant disadvantages attributable to the alfalfa component, particularly the characteristic objectionable alfalfa odor emanating from the product, and the typical physical instability of the finished product in the presence of liquid animal wastes, wherein the pellets tend to disintegrate and/or cling to the animal's feet.

While these disadvantages have been substantially overcome in the improved alfalfa-based composition described in U.S. Ser. No. 436,740 filed Jan. 25, 1974 by Fry, et al and of common assignment herewith, the techniques employed in the process for the production of this composition, such as the deodorization step employed to render the product substantially odor-free, tend to increase the cost of the finished product. Additionally, none of these known prior art compositions are based upon substrates with inherent insect-repellent characteristics, which also is less desirable to their use as an animal litter.

Accordingly, it is of interest to provide a composition useful as an animal litter which is relatively inexpensive, pleasantly scented and durable, and which additionally is based upon a substrate with insect-repellant properties.

SUMMARY AND OBJECTS OF THE INVENTION

The invention provides a cedar-based composition comprising particles of cedar material and an alfalfa binder. The alfalfa binder contributes absorbency and odor neutralizing characteristics to the composition, and unexpectedly functions as a highly effective binder to permit pelletization of the composition into durable pellets. The composition is particularly useful as an animal litter which is efficient and, owing to the inherent fragrance and insect repellent characteristics of the cedar material is pleasant to use.

Accordingly, it is an object of this invention to provide a pelletized cedar-based composition.

It is another object of this invention to provide a pelletized cedar-based composition which is particularly useful as an animal litter.

It is a further object of this invention to provide an animal litter which is durable, highly absorbent, and pleasantly scented, and which is characterized by odor-neutralizing properties and is based upon a material with known insect repellant characteristics.

It is an additional object of this invention to provide a process for the production of a pelletized cedar-based composition.

Other objects and advantages of the invention will be apparent from the following description and example.

DETAILED DESCRIPTION OF THE INVENTION

Broadly, the invention provides a cedar-based pellet produced by admixing cedar-derived material such as finely ground cedar wood with dehydrated alfalfa, moisturizing this admixture, and pelletizing in a conventional manner. The aflalfa functions as a binder in the product pellet, and contributes odor-neutralizing and absorption characteristics to the pellet, while the cedar material provides a pleasant scent and insect-repelling properties.

The cedar material employed in the composition is conveniently any appropriate cedar wood material such as splinters, chips, sawdust, or other wood waste material. The wood material is prepared for mixing by grinding in a hammermill or other conventional means to reduce the wood particles to a relatively small size. A typical screen analysis of the ground material would show 100% passing thru a Tyler No. 14 screen and about 20% passing thru a Tyler No. 100 screen.

The resultant cedar particles are then combined with dehydrated alfalfa particles. These alfalfa particles may be conveniently derived from conventional dehydrated alfalfa pellets or dehydrated alfalfa meal. The alfalfa is ground in a conventional manner to a screen size that approximates the ground cedar, and admixed with the cedar waste particles to form a mash.

More specifically, a pellet having satisfactory durability, or stability in the presence of liquid animal wastes, is obtained by admixing the particulate cedar material with the deydrated alfalfa in proportions of from about 50% to about 85% cedar to from about 15% to about 50% alfalfa, by weight. The use of amounts of alfalfa at the high end of this range, however, result in a pellet having a pronounced alfalfa odor. It is therefore preferred to admix the cedar material with alfalfa in proportions of about 75% cedar to about 25% alfalfa by weight so that optimum durability and a pleasant cedar scent are present in the finished pellet. The use of cedar material in substantial excess of 80% by weight of the admixture is detrimental to the physical properties of the finished product; for example, an admixture containing cedar 90% by weight cannot be pelletized into a durable pellet.

The cedar alfalfa mixture is then moistened with water or steam to provide a mash with a moisture content sufficient to yield from about 10% to about 19% by weight at the pellet extrusion point. The amount of moisture added to the mash to obtain this moisture content will vary according to factors including the moisture content of the wood waste and alfalfa source material. The ground wood waste typically has a moisture content of about 8–18%. The ground wood waste typically has a moisture critical to the pelletization process; either too much or too little water in the wood waste will produce an unsatisfactory pellet.

The mash is heated and then pelleted in a conventional pellet mill under conditions that will produce the desired pellet characteristics. To obtain pellets for use as an animal litter, the mash is preferably processed through the mill to produce a pellet having a density of from about 29 to about 37 lbs/cu.ft., a moisture content of from about 6% to about 12% by weight and a size of about 1/8 inch diameter and from about ⅛ inch to about ¼ inch in length.

The following example is provided as an illustration of typical embodiment of the process of this invention and the product thereof, and is not intended in any way to limit the scope of the invention to the specific constraints therein described.

EXAMPLE

Cedar waste comprising cedar-splinters having a bulk density of 16 lbs/cu.ft. and a moisture content of about 17% by weight were ground in a hammermill under the following conditions:

| R.P.M. | Hammers No. | Thck | Clearance H.Scrn | H-Brk Scrn | Perforation |
|---|---|---|---|---|---|
| 3600 | 8×7 | 1/4 | 3/4–1/2 Min | | 1/32 |
| | Density No. Cu.ft. in/out | | Ground Moisture Content (W+%) | | |
| | 15/17 | | 16% | | |

The resultant cedar waste grist was admixed with alfala having a bulk density of 24 lbs/cu.ft., and finely ground to approximate size of the cedar grind, in the ratio of 75% cedar grist to 25% alfalfa, by weight. The resultant admixture was placed in a conventional horizontal batch mixer, and moisturized to produce a moisture content in the mixture of 15% by weight. The resultant mash was thoroughly admixed at an agitator speed of 42 RPM, and transferred to a conventional pellet mill having the following specifications;

50=D Pellet Mill

| | |
|---|---|
| Motor: | 60 hp at 1200 RPM |
| Drive: | V-belt (variable speed transmission) |
| Feed: | 6" screw |
| Cover: | Cylindrical |
| Rolls: | Indent |

The mixture was pelletized to a diameter of ⅛ inch and a length of ¼ inch under the following conditions:

| Die | Serial Drawing | RPM | No. Hrs. | Roll Clearance |
|---|---|---|---|---|
| 1/8 × 1 | 71065 B3798-001-00 | 300 | 600 | Standard |
| Power Aug. | N-L Net | No. net hp.hr | Temp of in/out | No. cu. ft. in/out |
| 40.00 | 10.0 30.0 | 20 | 70/200 | 20/30 |

The resultant pellets were found to have a bulk density of 33 to 37 lbs/cu.ft. and a moisture content of 10 to 12% by weight. The pellets were found to have an absorption capacity of 220% by weight, with most absorption occurring on the periphery of the pellets.

It is apparent that the present invention provides a process for pelletizing particulate cedar material and a product having characteristics which renders it particularly useful as an animal litter. Although the invention has been described with respect to particular embodiments, it will be apparent that modifications to the described invention are possible within the purview of the invention, and no limitations are intended except by the scope of the appended claims.

What is claimed is:

1. A composition comprising an adherent mass of cedar particles, an alfalfa binder, and water.

2. The composition of claim 1, wherein said water comprises from about 6% to about 12% by weight of the adherent mass.

3. The composition of claim 1, wherein said cedar particles comprise less than about 90% by weight of the composition.

4. A pellet comprising cedar particles, an alfalfa binder, and water.

5. The process for the production of pellets of cedar particles comprising admixing cedar grist and particles of dehydrated alfalfa, moisturizing the resulting admixture, and pelletizing said moistened admixture.

6. A pellet comprising from about 50 to about 85% by weight cedar particles, from about 15 to about 50% by weight alfalfa as a binding material, and water as the remainder.

7. A process for producing pellets of cedar grist, dehydrated alfalfa, and water comprising mixing up to about 90% by weight of cedar grist with up to about 10% by weight dehydrated alfalfa, moistening the cedar grist-alfalfa admixture with water to provide a moisture content of from about 10% to about 20% by weight of said mixture, and thereafter pelletizing said moistened admixture.

8. An animal litter comprising pellets composed of cedar grist bound together with dehydrated alfalfa and water.

* * * * *